United States Patent [19]
Thumm et al.

[11] 3,819,344
[45] June 25, 1974

[54] METHOD AND APPARATUS PRODUCING PERTURBATIONS WHILE WINDING GLASS FIBERS

[75] Inventors: J. Randall Thumm; Cletis L. Roberson; Jerome P. Klink, all of Newark, Ohio

[73] Assignee: Owens-Corning Fiberglas Corporation, Toledo, Ohio

[22] Filed: Aug. 4, 1972

[21] Appl. No.: 277,962

Related U.S. Application Data

[62] Division of Ser. No. 789,725, Jan. 8, 1969, abandoned.

[52] U.S. Cl.................. 65/2, 65/11 W, 242/18 G, 425/76
[51] Int. Cl........................................... C03b 37/02
[58] Field of Search ......... 65/1, 2, 11 W; 242/18 G; 425/76

[56] References Cited
UNITED STATES PATENTS

| | | | |
|---|---|---|---|
| 2,391,870 | 1/1946 | Beach | 65/2 X |
| 3,256,079 | 6/1966 | Cochran | 65/2 |

FOREIGN PATENTS OR APPLICATIONS

| | | | |
|---|---|---|---|
| 530,468 | 12/1940 | Great Britain | 65/2 |
| 371,562 | 10/1963 | Switzerland | 65/11 W |

*Primary Examiner*—Robert L. Lindsay, Jr.
*Attorney, Agent, or Firm* — Staelin, Overman & Ronald C. Hudgens

[57] ABSTRACT

A multifilament textile product having predetermined dimensional perturbations along the length of the filaments sufficient to conceal otherwise visible contrasts in fabric produced from a textile product without the perturbations and method and apparatus for producing the product.

10 Claims, 9 Drawing Figures

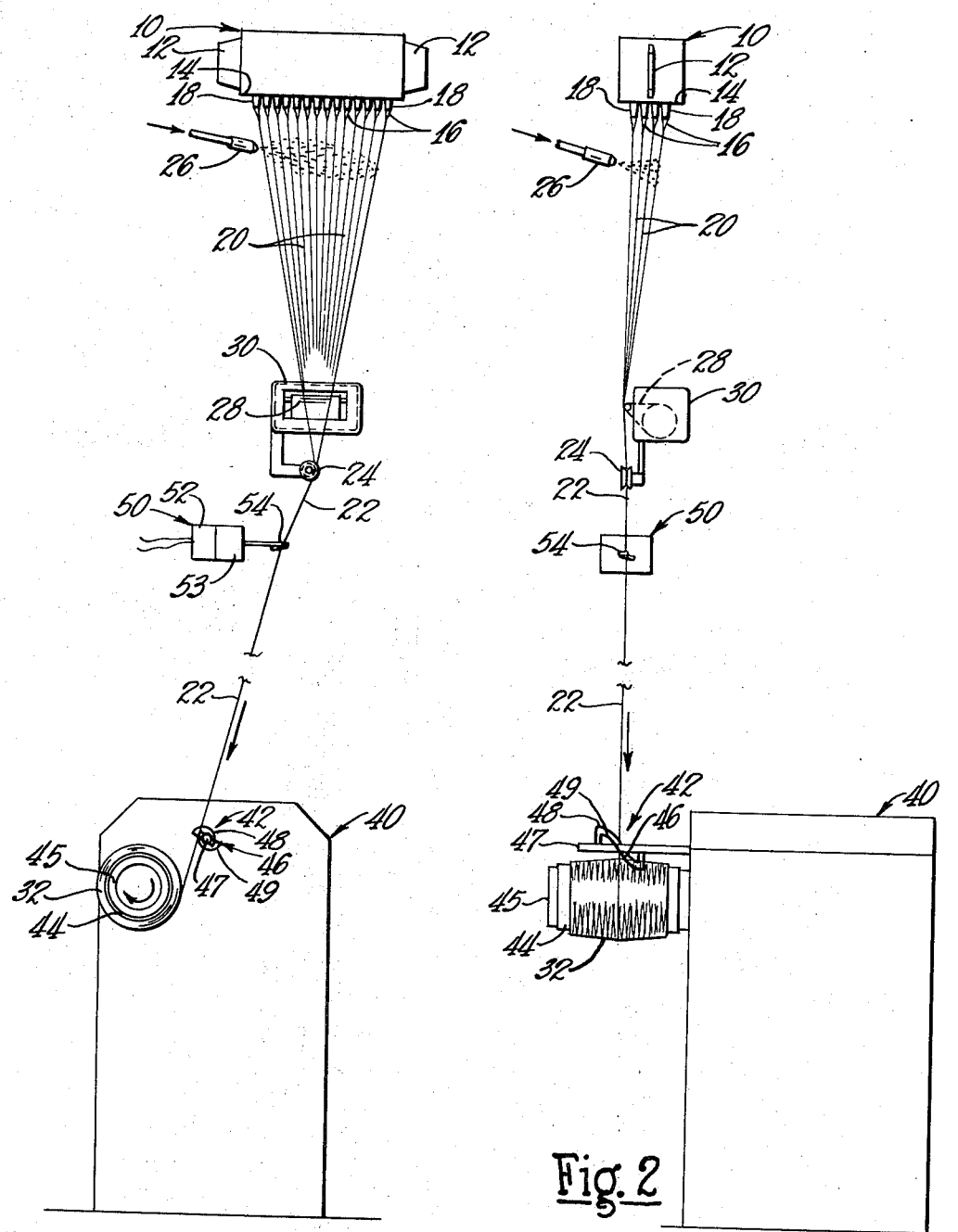

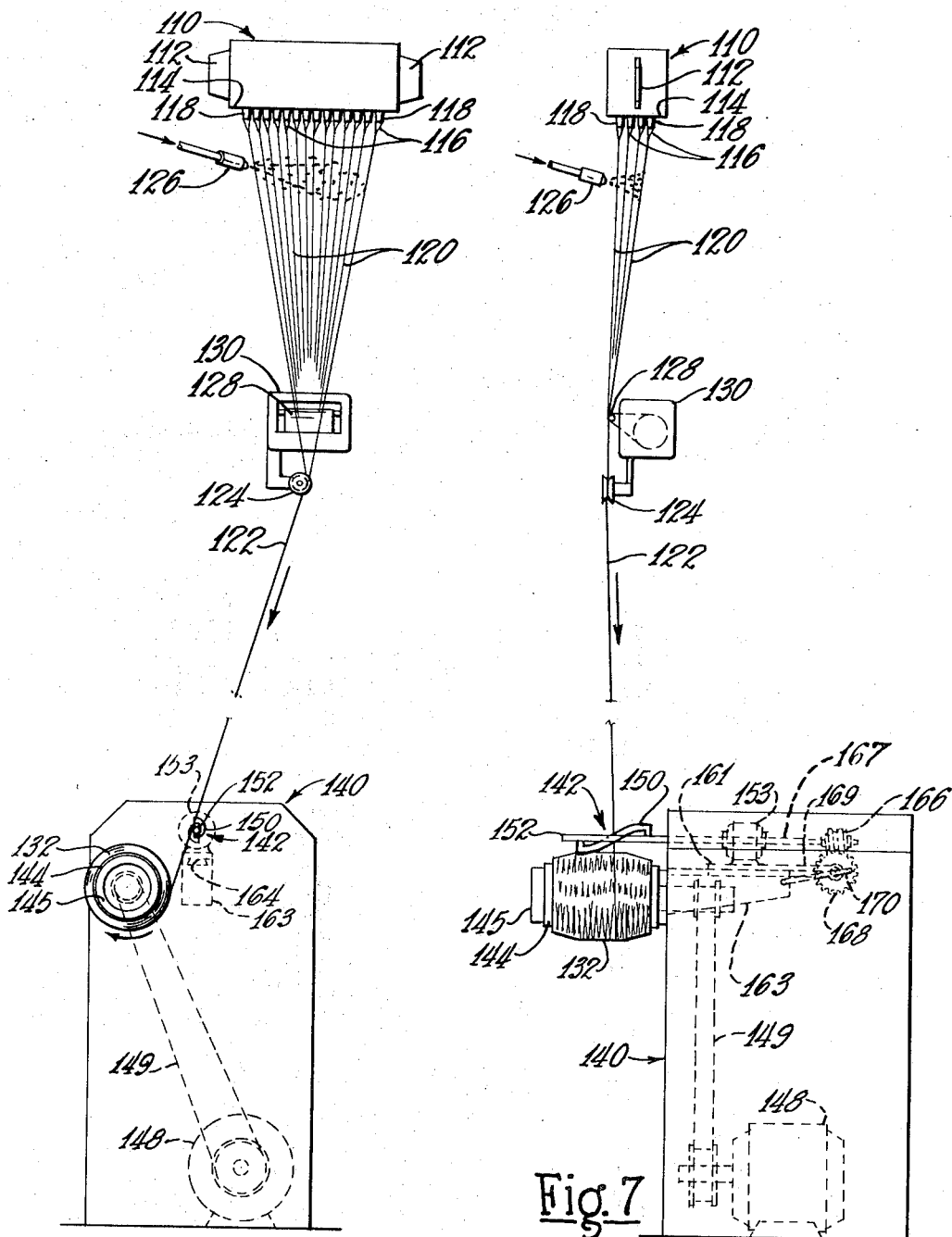

3,819,344

METHOD AND APPARATUS PRODUCING PERTURBATIONS WHILE WINDING GLASS FIBERS

This is a division, of application Ser. No. 789,725, filed Jan. 8, 1969 now abandoned.

BACKGROUND OF THE INVENTION

Improvements in the manufacture of synthetic filaments such as glass have widened their use. Today fine glass filaments find extensive use in the field of textiles, e.g., decorative products such as draperies, bedspreads, table cloths and industrial products such as reinforcement fabrics for plastics.

While there have been many improvements in the manufacture of continuous synthetic filaments, it has been a practical impossibility to produce synthetic filaments that have a uniform dimension along their entire length. This nonuniformity is true for glass as well as other synthetic filaments. Although improvements in forming continuous filament glass has reduced gross deviations from specified desired dimensions, general improvements in forming operations have brought to light or exposed extraneous undesired cyclic and usually smaller short length filament dimension variations induced in the filaments as their speed vary cyclicly during filament collection in the form of a strand on a winder. In large measure the filament nonuniformities occur because of filament speed variations that happen as the strand collects as a wound package. These prior art repetitive undesired filament nonuniformities combine in glass yarn and can periodically align in adjacent portions of a fabric to give undesirable visual contrasts or pattern defects in the fabric structure. When these unwanted visible contrasts occur, the fabric is so unappealing to the eye as to make the fabric unacceptable to the retail market.

Cyclic filament variations have persisted as a nagging problem. The closer processes approach filaments of uniform dimension the more one can perceive in a fabric undesired cyclic short length filament nonuniformities.

SUMMARY OF THE INVENTION

An object of the invention is to provide an improved multifilament textile yarn or thread that results in a more uniform fabric appearance without visible contrasts.

Another object of the invention is a multifilament textile yarn or filament bundle having continuous glass filament with dimensional perturbations occuring with such frequency and magnitude with respect to cyclic filament dimension variations to provide a fabric that substantially conceals contrasts from the cyclic dimensional variations otherwise visible in fabric produced from the yarn.

Still another object of the invention is a glass textile product providing a bundle of continuous filaments where each filament has predetermined diameter variations along its length such that a fabric made from such bundles does not exhibit visible contrasts.

In a broad sense these objects are attained by introducing forcibly and controllably dimensional perturbations or variations that are sufficiently present along the length of continuous filaments to provide, when combined into a bundle and made into a fabric, a fabric that does not exhibit visible contrasts or pattern defects plaguing prior art fabrics made from synthetic filaments. Such dimensional perturbations or variations in the filaments are in addition to the extraneous undesired variations induced into the filaments by the collection apparatus employed. In a sense, existing prior art cyclic extraneous and undesired filament dimensional variations can be overcome with dimensional "noise" imposed on the filaments. In such a case the "noise" need only be sufficiently present, e.g., amplitude and frequency, to produce controlled similar dimensional disturbances that overcome or blend with the extraneous cyclic filament dimension variations to reduce their effective contrast along the length of filaments. The controlled dimensional disturbances conceal contrasts otherwise visible in fabric made from filaments without the controlled dimensional variations.

In another sense one may change the dimensional characteristics of cyclic variations imparted to the filaments to give a yarn or thread that provides a fabric without visible contrasts or pattern defects. Such changes can include differences in the frequency and shape of repeating variations along filament lengths.

Other objects and advantages will become apparent as the invention is described more clearly hereafter in detail with reference made to the accompanying drawings.

DESCRIPTION OF THE DRAWINGS

FIG. 1 is a somewhat simplified front elevation view of apparatus for forming continuous filament glass strands according to the principles of the invention.

FIG. 2 is a side elevation view of the apparatus in FIG. 1.

FIG. 6 is a somewhat simplified front elevation view of modified apparatus for forming continuous filament glass strands according to the principles of the invention.

FIG. 7 is a side elevation view of the modified apparatus illustrated in FIG. 6.

DESCRIPTION OF THE PREFERRED EMBODIMENTS

Figures 3, 4:
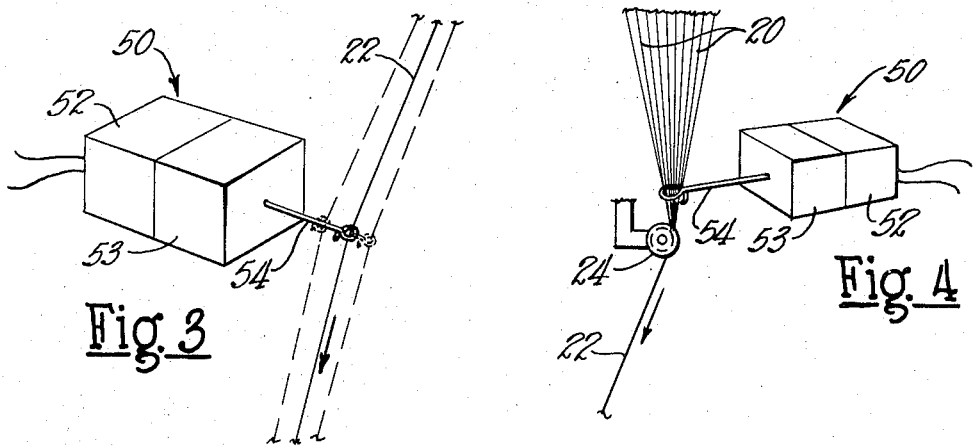
FIG. 3 is an enlarged perspective view of means shown in FIGS. 1 and 2 for introducing perturbations to modify the cross sectional dimensions of the glass filaments according to the principles of the invention.
FIG. 4 is a perspective view of the means shown in FIGS. 1, 2 and 3 for introducing perturbations to modify the cross sectional dimensions of the glass filaments according to the principles of the invention positioned at a location just before the filaments combine to form a strand.

While the invention finds particular utility with a textile product of glass, the invention may be used with other synthetic materials such as nylon, polyester, and the like. Thus, the use of glass to explain the operation of the invention is by example only.

FIGS. 1 and 2 show a process for forming continuous filament glass strand that collects as a wound package on a collector. Illustrated is a container or bushing 10 that holds a supply of molten glass. The container 10 may connect to a forehearth that supplies molten glass from a furnace or may connect to a means for supplying glass such as glass marbles, which are reduced to a heat-softened condition in a melter or other means associated with the container 10. Located at the ends of the container 10 are terminals 12 that connect to a source of electrical energy to supply heat by conventional resistance heating to glass held in the container 10 to maintain the molten glass at a proper fiber-forming temperature and viscosity. Moreover, the container 10 has a bottom or tip section 14 that includes a plurality of orifices or passageway for delivering streams 16 of molten glass from the container 10. As shown, the openings in the bottom 14 comprise a plurality of depending orificed projections or tubular members 18 through which the molten glass flows as the streams 16.

The molten streams 16 are attenuated into individual continuous glass filaments 20 that combine into a strand 22 by a gathering shoe 24 located below the container 10.

While the filaments 20 may be protected only by application of water to them, it is desirable in most instances to apply to them a conventional sizing or other coating material. A nozzle 26 may be located near the bottom 14 to spray water onto the newly formed filaments 20, preferably prior to combining the filaments 20 into the strand 22.

An applicator 28 supported within a housing 30 usually provided as shown in FIGS. 1 and 2 to apply sizing or other coating material to the filaments 20. The applicator 28 may be any suitable means known to the art such as endless belt that moves to pass through a sizing or coating liquid held in the housing 30. As the filaments 20 pass across the surface of the applicator 28, some of the liquid on the applicator transfers to them.

The strand 22 collects as a wound package 32 on a winder 40. Strand traversing means 42 moves the advancing strand 22 back and forth along the length of the package 32 as the strand 22 winds on a collector such as a tube 44, telescoped over a spindle or collet 45. The collet 45 is journaled for rotation on the winder 40. The winder 40 appropriately rotates the collet 45.

The strand traversing means 42 includes means for reciprocating the strand 22 adjacent to the package 32 with a motion that is a combination of rapid reciprocal motion and slow reciprocal motion.

As indicated in FIGS. 1 and 2, the traversing means 42 reciprocates the strand 22 by a "spiral wire" traverse device 46 mounted on a shaft 47, which is rotated by a motor within the winder 40. The traverse device 46 includes a pair of substantially spirally shaped complimentary cam members 48 and 49 that may be made of suitable materials capable of resisting the wearing action of the traveling glass strands 22, such as brass rod.

As the traverse device 46 rotates on the revolving shaft 47, the cam members 48 and 49 alternately engage the advancing strand 22 to rapidly reciprocate it lengthwise of the package 32. Normally the traverse device 46 rotates with sufficient speed to reciprocate the traveling strand 22 swiftly between 200 to 2,000 or more reciprocations per minute.

Because the stroke of the slower reciprocation is greater than the length of the traversing device 46, the builder motion of the winder 40 forms a "humped" or tapered package 32. As indicated in FIG. 2 the package 32 increases in diameter from the ends toward its mid-length, the maximum diameter of the package 32 occurring at about its mid-length. The slower traversing occurs usually at from 8 to 14 rpms.

As the strand 22 winds on the rotating package 32, its speed varies. When the strand 22 winds up the inclined surfaces of the package 32, the linear strand speed increases. When the strand 22 winds down the inclined surfaces of the package 32, the linear strand speed decreases.

These modifications to linear strand speed produces extraneous and undesired cyclic dimension variations along the length of the filaments 20. The apparatus of FIGS. 1 and 2 produce cyclic dimension variations that consist of zones of varying cross sectional dimensions along the length of the filaments 20, which can produce visible contrasts in fabric subsequently produced from the strand 22.

Located between the gathering shoe 24 and the package 32 is means 50 for introducing perturbations to modify the cross sectional dimension or diameter of glass filaments 20. As shown, means 50 comprises a signal generator 52, drive unit 53 and an arm 54. The arm 54 is a longitudinal member curved at its free end with a somewhat helical shape to capture for lateral movement the strand 22, which passes through the space defined by the curved free end. The input from the signal generator 52 actuates the drive unite 53, which moves the arm 54. Thus, the means 50 laterally moves, e.g., vibrates, the strand 22 to introduce dimensional perturbations along the length of the filaments 20. As shown the means 50 causes the path of the strand 22 to slightly bend. While such engagement with the strand 22 by the means 50 provides good results, such is not always necessary.

FIG. 3 more clearly illustrates the means 50 for introducing perturbations to modify the cross sectional dimensions of the filaments 20 (strand 22). The strand 22 runs through the space defined by the curved end of the arm 54, which is adapted for movement on the drive unit 53. While the dashed lines in FIG. 2 indicate axial reciprocal movement of the arm 54 to laterally move the strand 22, the design of the unit 53 may also provide for other arm motion, e.g., circular movement.

The signal generator 52 controls the magnitude and frequency of the motion of the arm 54 through the drive unit 53. The movement of the arm 54 can be random or a predetermined pattern. Good results obtain moving the arm 54 at from 1 to 150 cycles per second.

As the arm 54 moves, it carries the strand 22 with it. Such lateral movement or excursion of the strand 22 modifies strand speed, which changes the attenuating speed of the filaments 20 from the molten streams 16. Because attenuating speed affects filament cross sectional dimension, modified strand speeds introduce dimensional perturbations, i.e., modifies cross sectional dimensions along the length of the filaments 20. As the arm 54 carries the advancing strand 22 laterally of its path, the linear strand speed above the arm 54 increases the attenuate filaments 20 from the stream 16 of smaller cross sectional dimensions. Conversely, as the arm 54 moves to permit the strand to return to its original path, the linear strand speed above the arm 54 decreases to attenuate filaments 20 of increased cross sectional dimensions. Thus the movement of the arm 54 introduces controlled dimensional perturbations or dimensional variations along the length of the filaments 20 in sufficient number to reduce the effective contrast of the undesired dimensional variations along filament lengths and along a bundle or linear textile product of such filaments. Further, the controllably introduced dimensional perturbations along the length of a bundle, e.g., yarn or thread, of the filaments 20 conceal contrasts otherwise visible in fabric made from such bundles without the controlled dimensional perturbations.

The dimensional perturbations introduced into the filaments 20 of the strand 22 are in addition to the cyclic dimensional variations imparted to the filaments 20. These additional perturbations must occur with appropriate magnitude and frequency to substantially conceal contrasts from the cyclic dimension variations otherwise visible in fabric produced from the strand 22. Normally the dimensional perturbations have a cross sectional area at their largest zone substantially equal to the cross sectional area of the cyclic variations at their larger zones of cross section.

The arm 54 can be moved through enough distance to produce dimensional perturbations in the filaments 20 that are larger, the same or smaller in magnitude than the cyclic dimension variations.

In operation the apparatus shown in FIGS. 1 and 2 produces a strand 22 of glass filaments 20 with each filament having extraneous undesired cyclic dimension variations along its length that can form contrasts in fabric produced from the strand and other controllably introduced dimension variations along filament lengths occurring with sufficient frequency and magnitude to substantially conceal visible fabric contrasts. As the strand 22 advances to the package 32, the signal generator 52 actuates the drive unit 53 in predetermined fashion to move the arm 54, which laterally reciprocates the strand 22. The lateral motion given to the strand 22 by the means 50 imparts the controlled dimensional perturbations to the filaments 20. The controlled dimensional variations along the filament lengths combine in a linear textile product to conceal or mask out contrasts from the undesired dimensional variations visible in fabric made from such textile product without the controlled dimensional variations.

FIG. 4 shows the means 50 for introducing dimensional perturbations to the filaments 20 located above and adjacent the gathering shoe 24. The filaments 20 pass through the space defined by the curved portion of the arm 54 while still somewhat separated. As in the arrangement where the means 50 is located below the gathering shoe 24, the motion of the arm 54 imparts perturbations in the attenuation of the glass filaments 20 from the molten streams 16; however, the arm 54 moves the separated filaments 20 and not the strand 22. Because the individual filaments 20 move different lateral distances, the dimensional variations imparted to the individual filaments by the means 50 are not equal. Moreover the arm 24 can be adapted to move only a portion of the filaments 20, leaving some filaments undisturbed by the means 50 and hence without any separately induced dimension variations along their length.

Figure 5:
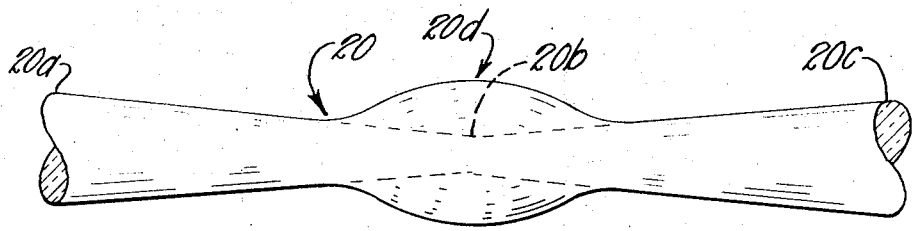
FIG. 5 is an enlarged representation of a portion of a filament having cross sectional dimension variations along its length according to the principles of the invention.

FIG. 5 is an enlarged representation of a short length of a glass filament 20. When the glass filament 20 attenuates without operation of the means 50 for introducing perturbations, the filament varies in its cross sectional area by tapering from a larger filament portion 20a to a portion 20b of smaller filament cross section, which is indicated with the dashed lines. Thereafter the filament increases in cross section again to a larger filament portion 20c. The distance from 20a to 20c is usually approximately in the range of from 2 to 3 yards, normally around 2.5 yards. When the means 50 operates, it introduces dimensional variations or perturbations such as the portion 20d, which as shown extends laterally between the portions 20a and 20c with about the same height or amplitude as these portions. As shown the dimensional perturbation 20d has a length considerably less than the magnitude of the filament distance between 20a and 20c. While the dimensional perturbation 20d is shown midway between filament portions 20a and 20 c, its location between such portions can vary. Moreover, its height dimension may also vary.

FIGS. 6 and 7 show another process for forming continuous filament glass strand that collects as a wound package on a collector. A container 110, which may connect to a forehearth that supplies molten glass from a furnace or may connect to a means for supplying glass such as glass marbles that reduce to a heat-softened condition in a melter or other means associated with the container 110. Located at the ends of the container 110 are terminals 112 that connect to a source of electrical energy to supply heat by conventional resistance heating to glass held in the container 110 to maintain the molten glass at a proper fiber-forming temperature and viscosity. Moreover, the container 110 has a bottom or tip section 114 that includes a plurality of orifices or passageway for delivering streams 116 of molten glass from the container 110. As shown, the openings in the bottom 114 comprises a plurality of depending orificed projections or tubular members 118 through which the molten glass flows as the streams 116.

The molten streams 116 are attenuated into individual continuous glass filaments 120, that combine into a strand 122 by a gathering shoe 124 located below the container 110.

A nozzle 126 located near the bottom 114 sprays water onto the newly formed filaments 120, preferably prior to combining the filaments 120 into the strand 122.

An applicator 129 supported within a housing 130 applies sizing or other coating material to the filaments 120. As the filaments 120 pass across the surface of the applicator 129, some of the liquid on the applicator transfers to them.

The strand 122 collects as a wound package 132 on a winder 140. Strand traversing means 142 moves the advancing strand 122 back and forth along the length of the package 132 as the strand 122 winds on a collector such as a tube 144, telescoped over a spindle or collet 145. The collet 145 is journaled for rotation on the winder 140. A motor 148 located within the winder 140 appropriately rotates the collet 145 through a non-slipping belt 149.

The strand traversing means 142 includes means for reciprocating the strand 122 adjacent to the package 132 with a motion that is a combination of rapid reciprocal motion and slope reciprocal motion.

As indicated in FIGS. 6 and 7, the traversing means 142 reciprocates the strand 122 by a "spiral wire" traverse device 150 mounted on a shaft 152, which is rotated by a motor 153 within the winder 140. The traverse device 150 includes a pair of substantially spirally shaped complimentary cam members 154 and 156 that may be made of suitable materials capable of resisting the wearing action of the traveling glass strand 122, such as brass rod. The spirally shaped cam members 154 and 156 have a length "L" normally in the range of from 5 to 9 inches.

Figure 8:
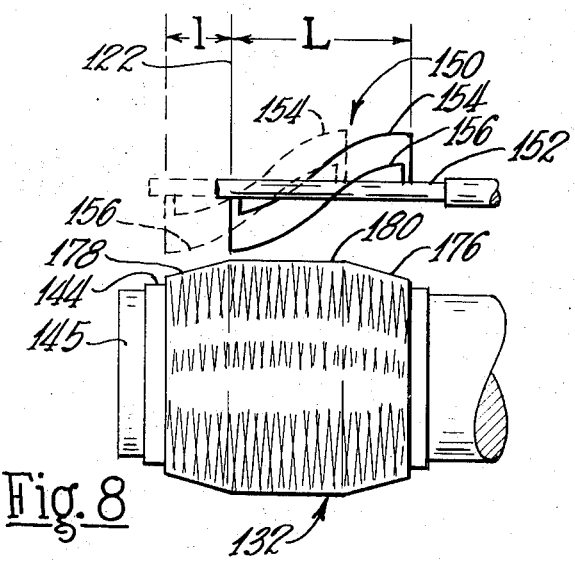
FIG. 8 is a somewhat enlarged view in elevation of the traversing means shown in FIGS. 6 and 7 where the dashed lines indicate another traversing location.

As more clearly shown in FIG. 8, each member of the traverse device 150 normally extends through slightly more than 180° of convolution and includes a short leg end, a long leg end, and a curved portion connection the legs. Thus, the short leg end of each member usually terminates inside (in axially direction) the associated large right end of the other complimentary cam member and is also overlapped by the larger leg end. As the traverse device 150 rotates on the revolving shaft 152, the cam members 154 and 156 alternately engage the advancing strand 122 to rapidly reciprocate it lengthwise of the package 132. Normally the traverse device 150 rotates with sufficient speed to reciprocate a traveling strand 122 swiftly between 200 to 2,000 or more reciprocations per minute.

Winder apparatus slowly reciprocates the traverse device 150 lengthwise of the collecting package 132 to provide the slower reciprocal component of movement to the traveling strand by axially moving the shaft 152. The dashed lines in FIG. 8 indicate this motion. As shown in FIGS. 6 and 7 such means includes a motor 153 mounted within the winder 140 on a support 161, a stationary mount 163 and drive apparatus. The support 161 slideably engages a guideway 164 in the stationary mount 163 for reciprocal movement along the axis of rotation of the shaft 152 by the drive apparatus. As illustrated in FIGS. 6 and 7 the drive apparatus includes suitable gearing driven by the motor 153, a worm gear 166 on the motor shaft 167 and a vertically mounted wheel gear 168 meshing with the worm gear 166, the apparatus moving the support 161 to reciprocate the shaft 152. A bracket 169 on the support 161 holds the wheel 168 for rotation. A link 170 pivotly mounts at one end eccentrically on the vertically disposed wheel gear 168 and pivotly connects at its other end to the stationary mount 163 to form a crank arrangement that effects the reciprocal movement of the shaft 152 through the associated slideably moveable support 161.

As the motor 153 turns its shaft 167, the worm gear 166 rotates the wheel gear 168. The eccentrically mounted link 170 moves with the rotating wheel gear 168 and functions to move the moveable support 161 back and forth in the guideway 164 on the stationary mount 163 to axially reciprocate the shaft 152. Normally the shaft 152 slowly moves with between 8 to 14 reciprocations per minute.

In the apparatus shown in FIGS. 6 and 7 the axial stroke "1" of the shaft 152 is less than the length "L" of the spirally shaped cams 154 and 156 of the traverse device 150, a stroke "1" of between one-half and one-fourth of the length "L" of the cams 154 and 156 preferred.

As the strand 122 winds onto the tube 144, the traversing means 142 moves the strand 122 back and forth lengthwise of the rotating collet 145 to form on the tube 144 the wound package 132 with tapered ends 176 and 178 and a substantially cylindrical central portion 180. Such package shape results from slowly reciprocating the traverse device 150 less than the length of the spirally shaped cams, "L." As illustrated in FIG. 8 the stroke "1" of the slow reciprocal motion is about one-half the length "L" of the cam members 154 and 156 of the traverse device 150.

The shape of the package 132 is important because it is the package shape that varies the linear strand speed, which affects the diameter of the filaments 120. Faster strand speeds cause the streams of molten glass to attenuate into filaments with smaller cross sectional dimensions. As the strand 122 winds into the package 132 the varying dimensions of the package 132 causes variations in the speed of the strand 122 to provide each filament with diameter variations along its length. The strand speed increases as the strand 122 moves up the inclined surfaces of the tapered ends 176 and 178 and remains substantially constant as the strand 122 moves across the central portion 180. The strand speed decreases as the strand 122 moves down the inclined surfaces of the tapered ends 176 and 178.

Figure 9:
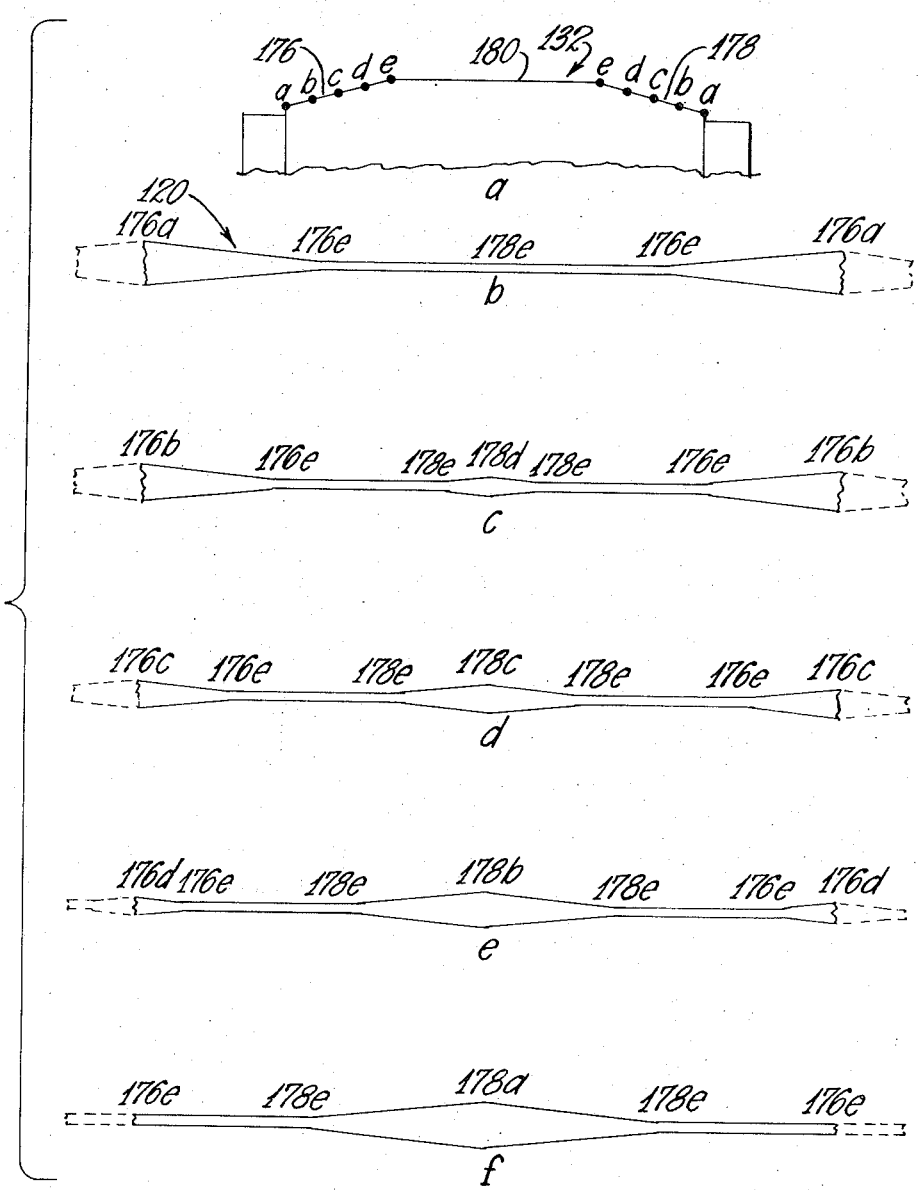
FIG. 9 is an enlarged representation of portions of a filament having dimension variations along its length according to the principles of the invention shown in relation to the collection package for the filament.

FIGS. 9b – 9f represents filament sections or zones along the length of the filaments 120 produced by the apparatus shown in FIGS. 6 and 7 and collected on the package 132, which is indicated in FIG. 9a. Both the illustrated package and zones have corresponding numbers indicating locations on the package giving rise to the filament diameter variations.

FIG. 9b shows diameter variations in a filament zone produced with the traversing device 150 moving from one end or reversal point of a slow reciprocal motion stroke. The filament zone includes two portions. The filaments 120 attenuate from the molten streams 116 with increasing speed as the strand winds across the package 132 up the inclined surface of the tapered end 176 from location 176a to location 176e and produces a first filament portion reducing in diameter, i.e., tapered, from an end to a smaller diameter spaced from the end. The filament diameter remains substantially constant and equal to the smaller diameter as the strand collects on the package 132 with substantially uniform speed across the central portion 180 from 176e to 178e. As the traversing device 150 moves the strand 122 back across the length of the package 132 from 178e to 176e, the filament diameter variations or dimensional perturbations substantially repeat in the zone but in reverse order to produce the second portion of the zone, which is essentially the mirror image of the first portion. Thus, the zone has ends tapering from a larger diameter to a smaller diameter and a central portion of substantially cylindrical shape extending between the ends at the smaller diameter. Because the location of the traverse device 150 also changes location with respect to the package 132 during its return stroke, the larger end of the second tapered end portion of the zone may be slightly smaller in diameter than the larger end of the first tapered end portion. In a sense one may consider the central portion, or cylindrical portion, of the filament zone to be two cylindrical filament portions in immediately adjacent and connected relation at the mid-length of the zone and the tapered end portions of the zone as being in separated or spaced relation at the ends of the zone.

FIG. 9c shows diameter variations in another two portion zone produced with the traverse device 150 moving from a location intermediate the ends of the slow reciprocal motion stroke. In the first portion, as the strand 122 winds up the tapered end 176 of the package 132 from location 176b to location 176e the filaments 120 attenuate from the molten streams 116 with increasing speed to reduce the diameter of the filaments as in the case of the filament zone shown in FIG. 9b; however, the length of the tapered portion is shorter and the diameter of its base or larger end is smaller than the tapered end portion shown in FIG. 9b. Such differences occur because the beginning location 176b provides a faster strand speed for the attenuating filaments and the distance between 176b and 176e is shorter than between 176a and 176e. The smaller diameter of the filament remains substantially constant as the strand 122 winds across the central portion 180 of the package 132 from location 176e to 178e. As the traverse device 150 moves the strand 122 from location 178e somewhat down the inclined surface 178 to location 178d, the strand speed reduces to produce filaments 120 having a slight central tapered portion of increasing diameter. The traverse device 150 reverses the motion of the strand 122 back across the package from location 178d to substantially location 176b to form the second portion of the zone, which is substantially the mirror image of the first portion. The central tapered portions touch at their base or larger end at the mid-length of the zone. Such ends are small in comparison to the large ends of the tapered end portion of the zone. The cylindrical portions are equal in length and have a combined length equal to the length of the total cylindrical portion of the zone of FIG. 9b. Also, because the location of the traverse device 150 also changes location with respect to the package 132 during its return stroke, the larger end of the second tapered end portion of the zone may be slightly smaller in diameter than the larger end of the first tapered portion.

FIG. 9d shows diameter variations in yet another two portion zone produced with the traverse device 150 moving from a location intermediate the ends of the slow reciprocal motion stroke to move the strand 122 from a package location 176c on the tapered end 176 to location 178c on the tapered end 178 of the package 132. The zone remains tapered at the ends; however, the central tapered portions increased in diameter and length to be approximately the same size as the tapered ends. The cylindrical portions of equal length are further separated. The FIG. 9e indicates yet another intermediate position for the traverse device 150 between 176d to 178b where a filament zone attenuates with only slightly tapered ends and an increased tapered central portion that further increases the separation between the cylindrical portions of equal length. The cylindrical portions in both the representations of FIGS. 9d and 9e have the combined length equal to the length of the total cylindrical portion of the zone in FIG. 9b.

FIG. 9f shows diameter variations in a zone produced with the traverse device 150 moving from the other end of the slow traverse stroke. The movement producing the zone of two portions begins as the strand 122 moves across the package 132 from location 176e to 178e and down the inclined surface of the tapered end 178 to location 178a and returns to 176e. The ends of the zone are cylindrical with length equal to the cylindrical portions of the other zones and increasing in diameter to a maximum diameter at the mid-length of the zone. From the mid-length the filament diameter reduces to a second cylindrical portion equal in length to the cylindrical portion of the first portion. The tapered central portions are equal in length. The combined length of the cylindrical portions equal to total length of the cylindrical portion shown in FIG. 9b.

While each zone includes a filament portion of substantially uniform cross section and a filament portion of varying diameter extending along the length of the zone, the length of the substantially uniform cross section portion and the length of the varying diameter portion in each zone is in a constant fixed predetermined ratio. The length of the uniform or cylindrical filament portions within each zone are substantially equal throughout all zones. These two cylindrical segments of substantially equal length change locations progressively in succeeding zones from abutting relation at the mid-length of one of the zones to spaced apart relationship at the ends of the zone and separated by filament portions of varying diameter and returning again to their abutting relationship.

Good results have been obtained where the length of the filament zones shown in FIGS. 9b through 9f are from 3.5 yards to 5.25 yards.

The speed of the collet 145 and traversing device 150 can be modulated together according to U.S. Pat. No. 1,109,602 to Smith to provide substantially the same strand speeds throughout the build of the package 132. Such modulated speed keep substantially the same filament cross sectional dimensions throughout the package 132, otherwise the increased size of the package 132 will progressively increase the strand speed to somewhat reduce the overall cross sectional area of the filament 122 throughout the package.

It is apparent that within the scope of the invention modifications and different arrangements may be made other than herein disclosed. The disclosure is merely illustrative, the invention comprehending all variations thereof.

We claim:

1. A process of making continuous filament glass strand for production of fabrics of uniform appearance irrespective of inherent undesired cyclic filament diameter variations along the lengths of the filaments comprising:

supplying a plurality of streams of molten glass;
attenuating the streams downwardly to form continuous glass filaments;
combining the filaments into an advancing strand;
winding the strand into a package;
reciprocating the advancing strand axially of the package by a combination of a fast reciprocating motion and a slower reciprocation motion effective to form the wound package into a shape that is larger in diameter in its middle than its end regions, such collection of the strand into the wound package forming the undesired cyclic filament diameter variations along the length of the filaments;
introducing filament perturbations effective to modify the diameters of the glass filaments as they are attenuated from the streams, the perturbations being introduced at a frequency of from 1 to 150 cycles per second with a magnitude to substantially conceal contrasts from the cyclic diameter variations otherwise visible in fabric produced from the strand; and collecting the strand.

2. The process recited in claim 1 where the perturbations are introduced by laterally moving the advancing strand.

3. The process recited in claim 1 where the perturbations are introduced by laterally moving the filaments immediately prior to combining the filaments into a strand.

4. The process recited in claim 3 where only some of the filaments are moved to modify their cross sectional areas by such perturbations.

5. The process of making glass strand comprising:
supplying a plurality of streams of molten glass;
attenuating the molten glass streams into continuous glass filaments by winding the filaments into a rotation package;
combining the filaments into an advancing strand;
effecting a reciprocation motion of the strand relative to the package in an axial direction thereof by a fast reciprocating motion and a slower reciprocating motion effective to form the package into a shape that is larger in its middle than its end regions, such collection of strand into the wound package forming cyclic diameter variations along the length of the filaments;
introducing filament perturbations effective to modify the diameter of the glass filaments by vibrating the filaments at a location spaced from the package winding zone, the filament perturbations being introduced at a frequency of from 1 to 150 cycles per second with a magnitude effecting diameter variations in the filaments at least as large as the cyclic dimension variations to substantially conceal contrasts from the cyclic diameter variations otherwise visible in fabric produced from the strand; and
collecting the strand.

6. Apparatus for making continuous filament glass strand for production of fabrics of uniform appearance irrespective of inherent undesired cyclic filament diameter variations along the length of the filaments comprising:
means for supplying a plurality of streams of molten glass for attenuation into continuous glass filaments;
means for combining the filaments into an advancing strand;
a rotatable collector upon which the strand is wound into a package;
means for rotating the collector;
traversing means for effecting a reciprocating strand motion relative to the package in an axial direction thereof by a fast reciprocating motion and a slower reciprocating motion effective to form the wound package into a shape that is bigger in diameter in its middle than its end regions, such collection of the strand forming cyclic diameter variations along the length of the filaments;
means for introducing filament perturbations effective to modify the diameters of the glass filaments as they are attenuated from the streams by vibrating the filaments at a location spaced from the package, the perturbations being introduced at a frequency of from 1 to 150 cycles per second with a magnitude effective to conceal contrasts from the cyclic diameter variations otherwise visible in fabric produced from the strand; and
means for collecting the strand.

7. The apparatus recited in claim 6, where the means for introducing perturbations laterally moves the advancing strand.

8. The apparatus recited in claim 6, where the means for introducing perturbations laterally move the filaments at a location immediately prior to combining the filaments into a strand.

9. The apparatus recited in claim 8 where the means for introducing perturbations moves only some of the filaments to modify their cross sectional areas by the perturbations.

10. Apparatus for making continuous filament glass comprising:
means for supplying a plurality of streams of molten glass for attenuation into continuous glass filaments;
means for combining the filaments into a strand;
a rotatable collection upon which the strand is wound into a package;
means for rotating the collector;
means for reciprocating the strand axially of the collector to distribute the strand on the package, such means including a strand traversing means for rapidly reciprocating the strand and means for slowly reciprocating the strand traversing means, reciprocation of the strand forming the packaging that is larger in diameter in the middle than its end regions, such collection of the strand forming cyclic diameter variations along the length of the filaments;
means for vibrating the filaments at a location spaced from the package to introduce filament perturbations effective to modify the diameter of the glass filaments as they are being attenuated, the perturbations being introduced by such means at a frequency of from 1 to 150 cycles per second with a magnitude causing diameter variations at least as large as the cyclic diameter variations to conceal contrasts from the cyclic diameter variations otherwise visible in fabric produced from the strand; and means for collecting the strand.

* * * * *